United States Patent [19]

Nagashima et al.

[11] Patent Number: 4,918,542
[45] Date of Patent: Apr. 17, 1990

[54] IMAGE PROCESSING APPARATUS CAPABLE OF SMOOTH MULTI-AREA VARIABLE MAGNIFICATION PROCESSING

[75] Inventors: Nao Nagashima; Toshihiro Kadowaki, both of Yokohama, Japan

[73] Assignee: Canon Kabushiki Kaisha, Tokyo, Japan

[21] Appl. No.: 91,901

[22] Filed: Sep. 1, 1987

[30] Foreign Application Priority Data

Sep. 2, 1986 [JP] Japan .................................. 61-207018

[51] Int. Cl.$^4$ ............................................. H04N 1/393
[52] U.S. Cl. ..................................... 358/451; 358/474; 358/486
[58] Field of Search ................. 358/287, 288, 285, 77, 358/451, 474, 486

[56] References Cited

U.S. PATENT DOCUMENTS

| | | | |
|---|---|---|---|
| 4,275,450 | 6/1981 | Potter | 358/77 X |
| 4,290,084 | 9/1981 | Minshull et al. | 358/287 X |
| 4,394,693 | 7/1983 | Shirley | 358/287 X |
| 4,449,151 | 5/1984 | Yokota et al. | 358/293 |
| 4,569,081 | 2/1986 | Mintzer et al. | 358/287 X |
| 4,605,957 | 8/1986 | Yamada | 358/77 X |
| 4,636,869 | 1/1987 | Tomohisa et al. | 358/77 X |
| 4,679,096 | 7/1987 | Nagashima | 358/77 X |
| 4,686,580 | 8/1987 | Kato et al. | 358/77 X |
| 4,701,808 | 10/1987 | Nagashima | 358/287 |
| 4,743,963 | 5/1988 | Abuyama | 358/77 |

FOREIGN PATENT DOCUMENTS

| | | | |
|---|---|---|---|
| 93429 | 11/1983 | European Pat. Off. | |
| 137208 | 4/1985 | European Pat. Off. | 358/287 |
| 2543771 | 10/1984 | France | |
| 57-097271 | 6/1982 | Japan | 358/287 |
| 57-210767 | 12/1982 | Japan | 358/77 |
| 2134350A | 8/1984 | United Kingdom | |

*Primary Examiner*—Edward L. Coles, Sr.
*Attorney, Agent, or Firm*—Fitzpatrick, Cella, Harper & Scinto

[57] ABSTRACT

An image processing apparatus in which an image is read by division into plural areas. An image size variation for an area is conducted with the same image magnification as for a preceding area, so that the images of plural areas are smoothly connected.

16 Claims, 12 Drawing Sheets

IMAGE PROCESSING APPARATUS CAPABLE OF SMOOTH MULTI-AREA VARIABLE MAGNIFICATION PROCESSING

BACKGROUND OF THE INVENTION

1. Field of the Invention

The present invention relates to an image processing apparatus for processing image signals obtained by reading an original image with line image sensors such as CCD's.

2. Related Background Art

The assigned of the present invention has already proposed, in U.S. patent application Ser. No. 798,672, filed Nov. 15, 1985, an image reading apparatus of serial scanning process, in which a linear image sensor, having a reading area shorter than the width of original image, is employed and is moved in a sub scanning direction after each main scanning operation to read the entire original image area.

FIG. 1 illustrates the image reading operation of such serial scanning image reading apparatus.

A linear image sensor 1, composed of a CCD, scans a reading area RA by a movement along the illustrated trajectory, starting from a home position HP, by means of an unrepresented main scanning drive system for moving said CCD image sensor 1 in the main scanning direction and an unrepresented sub-scanning drive system for moving said sensor in the sub-scanning direction. The reading area RA is read in succession in the order of scans (1) to (5), so that the entire reading area is read by plural main scanning operations.

In such image reading apparatus, the image variable magnification processing, such as image reduction or enlargement, is generally achieved, in the main scanning direction, by a mechanical method of varying the scanning speed, or the moving speed of the CCD image sensor 1, in accordance with the rate of image size variation (variable magnification), and, in the sub scanning direction of the scanning direction of CCD, by an electrical variable magnification method of thinning out or padding image data.

In a case where the number of image data in the scanning direction of CCD is variable and the charge accumulating time of CCD is constant and continuous, an image size reduction to 50% can be achieved by doubling the moving speed of the CCD image sensor 1 in the main scanning direction, compared to the speed in the equal image size reading, and by thinning out every other pixel of the image data in the CCD scanning direction. On the other hand, an image size enlargement to 200% can be achieved by reducing the moving speed of the CCD image sensor 1 in the main scanning direction to a half compared to the speed in the equal image size reading, and by repeating every pixel twice, in the image data in the CCD scanning direction.

In such neat image magnification as 50% or 200%, i.e., where the magnification is an integer or the inverse of an integer, the image connecting process for maintaining the continuity of image at the boundaries of the scans (1) to (5) is relatively simple, but, for such image magnification as 59% or 167%, there is required a very complex process for the image connection. Also, if an additional image processing such as smoothing is conducted after the image size variation, image data before and after the processed pixel are additionally required and the image connection at such image size variation becomes even more complex.

FIG. 2 shows an example of electric image size varying circuit for thinning out or padding image data.

Input image data are alternately stored in random access memories (RAM) 13, 15. The image size reduction is achieved by thinning out image data at the storage thereof into said memories, while the image size enlargement is achieved by padding the image data at reading from said memories, and the obtained output image data are supplied to a following circuit.

A D-type flip-flop (DFF) 10 is provided for latching the input image data, by means of an image clock signal WRCK supplied in synchronization with the input image data.

A decimal rate multiplier (DRM) 11 thins out the image clock signal WRCK to generate a clock signal WRCM for image size reduction. It is composed for example of an SN74167, a standard TTL device supplied by Texas Instruments, and generates a thinned out clock signal WRCM according to a binary coded decimal number such as "99" or "55" set at a data input terminal. Since said device SN74167 is unable to transmit the image clock signal WRCK without change, an external circuit is added to enable signal transmission in case image size reduction is not conducted. A synchronization signal WRST, for synchronization of every line, clears a counter incorporated in the DRM 11 upon shifting to the low level state, whereby the image clock signal WRCK is thinned out in the same manner during the period of a main scanning operation.

A counter 12 generates the write-in addresses for the RAM 13, 15, and counts upward from zero in response to the synchronization signal WRST.

A D-type flip-flop 18, for latching the data read from the RAM 13, 15 and selected by a selector 17, latches the data by an external image clock signal RDCK.

A binary rate multiplier (BRM) 19 thins out the image clock pulses RDCK to generate clock pulses RDCM for image enlargement. It is composed for example of an SN7497, a standard TTL device supplied by Texas Instruments, and generates thinned out pulses RDCM according to a binary number such as "6FF" or "955" (hexadecimal) set at a data input terminal. Since said device SN7497 is unable to transmit the image clock pulses RDCK without change, an external circuit is added in order to enable signal transmission in case image size enlargement is not conducted. A synchronization signal RDST, for synchronization of every line, clears a counter incorporated in the BRM 19 upon shifting to the low level state, whereby the image clock pulses RDCK are thinned out in the same manner during the period of a main scanning operation.

A counter 20 generates the read-out addresses for the RAM's 13, 15, and counts upward from zero in response to the synchronization signal RDST.

The RAM's 13, 15 execute writing and reading of the image data according to the write-in addresses of the counter 12 or the read-out addresses of the counter 20, selected by selectors 14, 16, and constitute so-called double buffer in which a RAM effects data writing while the other effects data reading.

In the above-explained structure, image data thinned out corresponding to the rate of image reduction are stored in the RAM's 13, 15 by forming the write-in addresses according to the clock pulses WRCM obtained by thinning out, according to the rate of image reduction, the image clock pulses WRCK entered in synchronization with the input image data. Also image data padded corresponding to the rate of image enlargement are obtained from the latch 18, by forming the read-out addresses for the RAM's 13, 15 according to the clock pulses RDCM obtained by thinning out the image clock pulses RDCK corresponding to the rate of image enlargement.

FIG. 3 illustrates an image connecting process at an image size variation.

In FIG. 3, an upper row shows the state of the image reading line when the reading area is viewed in the CCD scanning direction (sub-scanning direction) in FIG. 1, or the state of output pixels in the equal-size image reading operation. The pixels a, b, c and d are those involved in the image connecting operation between an l-th scanning and an (l+1)-th scanning, and, in the present example, a smoothing process by a 3×3 matrix is to be applied by a following circuit.

A lower row in FIG. 3 shows the state of output pixels in case of an image enlargement to 150%. Pixels a', a'', b', c', c'' and d'' respectively correspond to pixels a, b, c and d padded to 150%.

In the present example, in the case of an image enlargement to 150%, it is necessary to release pixels a', a'', b', c', c'' in the l-th scanning and pixels a'', b', c', c'', d'' in the (l+1)-th scanning. The method of image connection is variable according to the number of pixels of the CCD image sensor 1 and the image magnification, so that the positions of pixels to be padded or thinned out have to be modified accordingly.

In order to achieve exact image connection as shown in FIG. 3 with the circuit structure shown in FIG. 2, the outputs of the incorporated counters of the DRM 12 and BRM 19 have to coincide each other at the image connecting position, and, for this purpose, it becomes necessary to control exact data on the image size variation such as the counter presetting and the counter reading at the image connecting position, in addition to the counter clearing. Consequently the circuit inevitably becomes large and complex.

Also an additional circuit becomes necessary for effecting the writing and reading of the image data at an arbitrary timing after the entry of the synchronization signals WRST, RDST.

However, if the image data are thinned out or padded independently for each main scanning operation, the pitch of thinned out or padded pixels may become different, at the junction of the data obtained from the l-th main scanning and those from the (l+1)-th main scanning, from that in other parts, so that the output image may become distorted at such junction.

SUMMARY OF THE INVENTION

In consideration of the foregoing, an object of the present invention is to provide an image processing apparatus capable of providing a satisfactory output signal by image reading at an arbitrary image magnification.

Another object of the present invention is to provide an image processing apparatus capable of image size variation without distortion.

Still another object of the present invention is to provide an image processing apparatus capable, in a case of reading an image by dividing it into plural areas, of executing an image size variation process at the boundary of neighboring areas.

Still another object of the present invention is to provide an image processing apparatus capable of arbitrarily selecting the positions of image data where said data are thinned out or padded for image size variation.

The foregoing and still other objects of the present invention, and the advantages thereof, will become fully apparent from the following description.

DETAILED DESCRIPTION OF THE PREFERRED EMBODIMENTS

Now the present invention will be clarified in detail by embodiments thereof.

Figure 1:
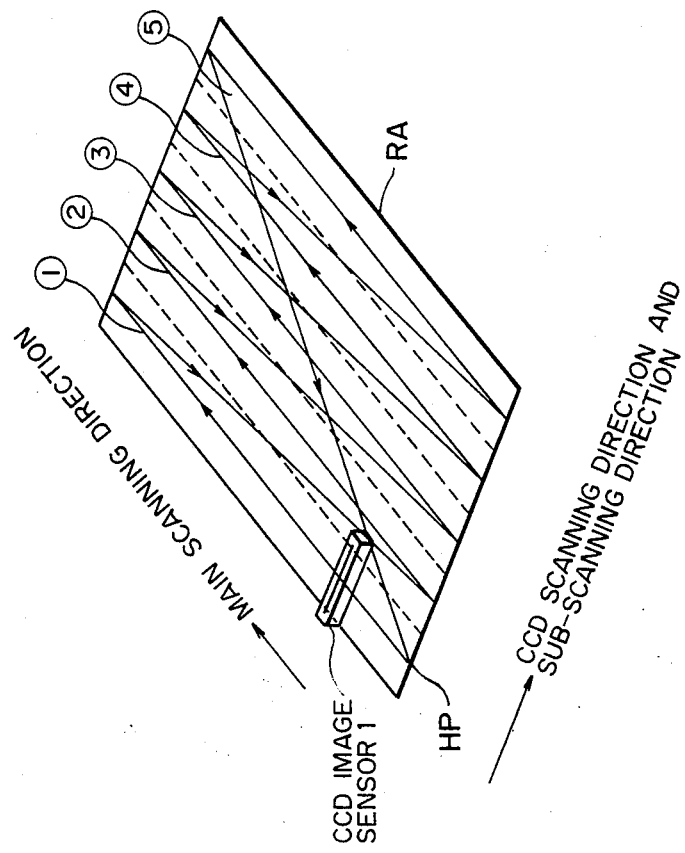
FIG. 1 is a schematic view showing the principle of serial scanning process.
Figure 2:
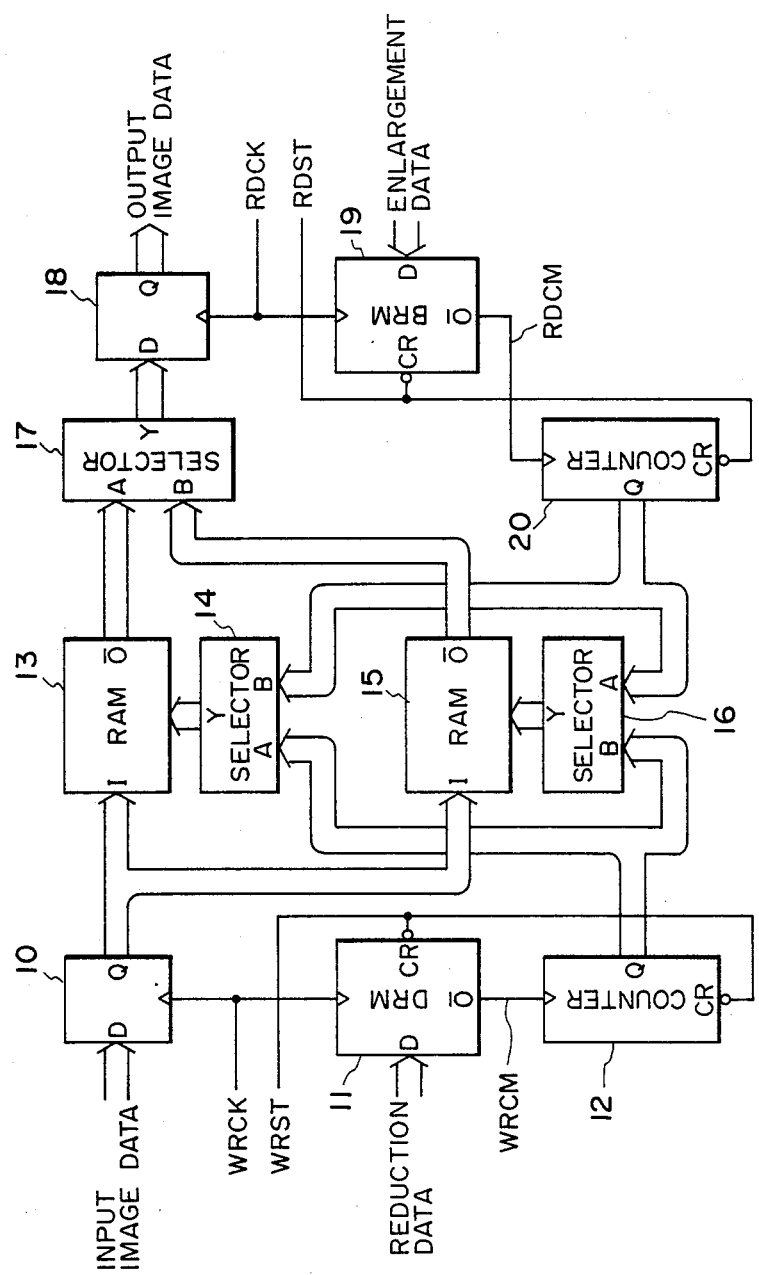
FIG. 2 is a block diagram showing an example of a conventional image size varying circuit for thinning out or padding image data.
Figure 3:
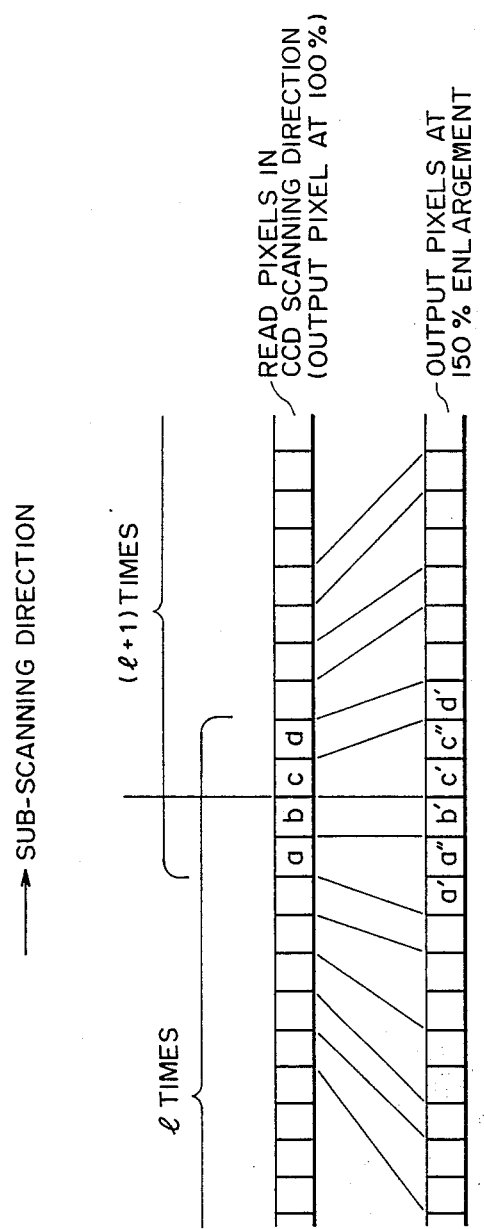
FIG. 3 is a schematic view showing the principle of image connecting process at an image size variation.
Figure 4:
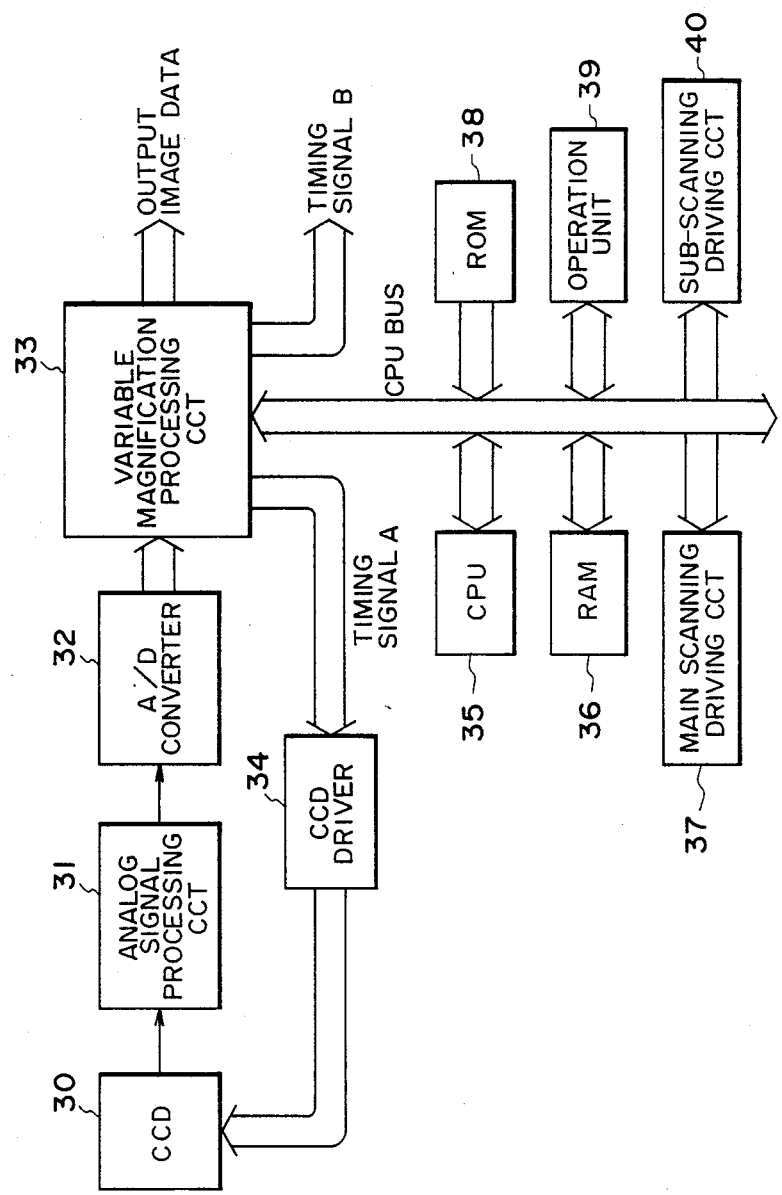
FIG. 4 is a control block diagram of an image reading apparatus of serial scanning process, in which the present invention is applicable.

FIG. 4 is a block diagram showing an example of a control circuit employed in the image reading apparatus of serial scanning process shown in FIG. 1, in which the present invention is applicable.

A CCD 30, corresponding to the CCD image sensor 1 in FIG. 1, is an image sensor composed of a linear array of plural photoelectric converting elements.

An analog image signal released from the CCD 30 is supplied to an analog signal processing circuit 31 for shading correction, noise component elimination, amplification, etc., and is further supplied to an analog-to-digital (A/D) converter 32.

Said analog image signal is converted, in the A/D converter 32, into a multi-level digital image signal, which is then supplied to a magnification varying process circuit 33 provided with an image connecting unit.

Said magnification varying process circuit 33 not only executes image size variation and image connection but also generates plural timing signals A for driving the CCD 30 and plural timing signals B relating to output image data obtained from image size variation and image connection.

A CCD driver 34 generates drive signals for the CCD 30 in response to said timing signals A.

A CPU 35 is composed of a microcomputer for controlling the entire image reading apparatus. Control programs thereof are stored in a read-only memory (ROM) 38. The CPU 35, utilizing a random access memory (RAM) 36 for temporary storage of data, controls an operation unit 39 through which the operator enters the instructions for starting or stopping the image reading operation and for designating the image magnification; a main scanning drive circuit 37 for controlling the movement of the CCD 30 in the main scanning direction; a sub-scanning drive circuit 40 for controlling the movement of the CCD 30 in the sub scanning direction; and the image magnification varying circuit 33.

Figure 5:
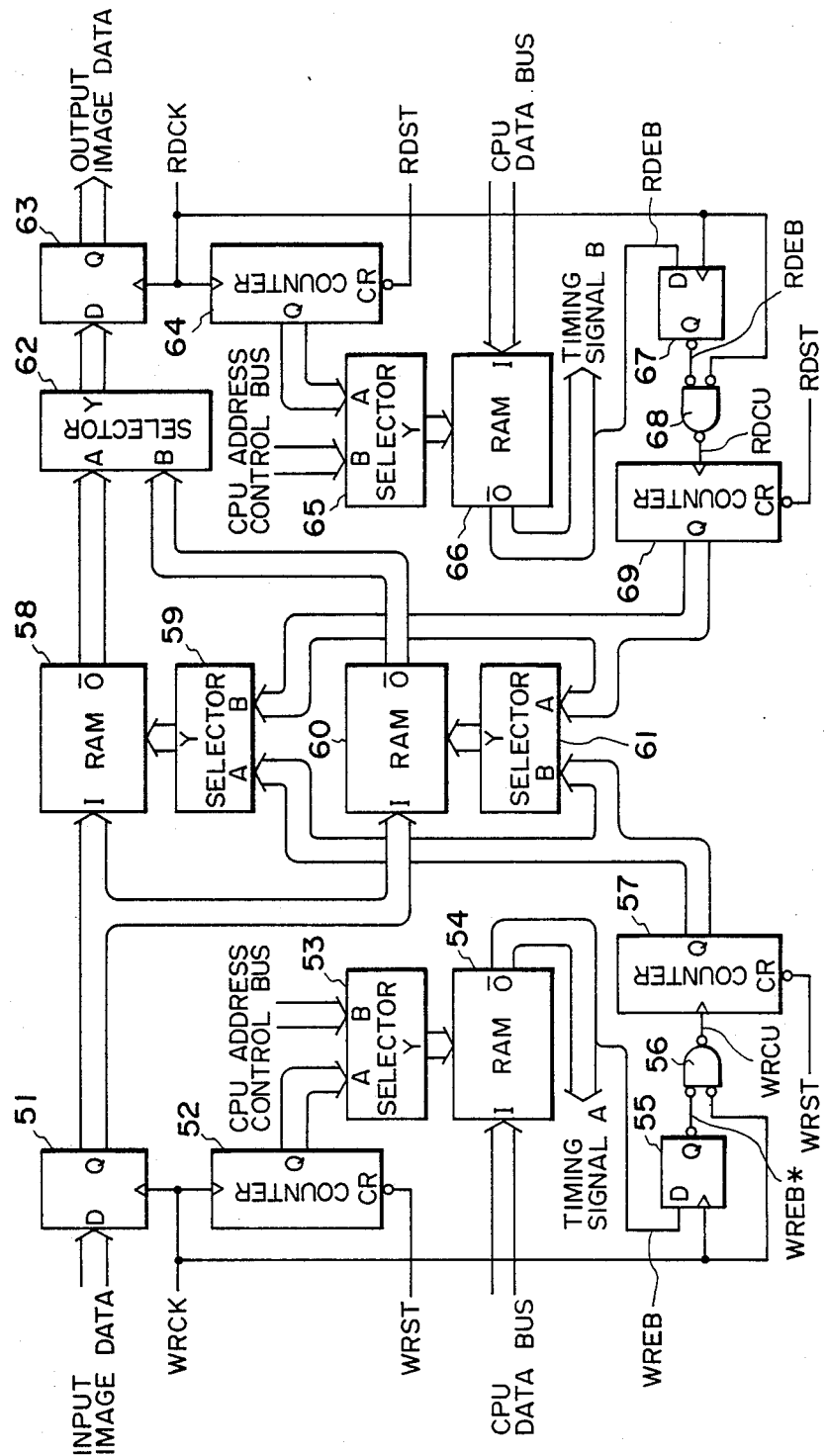
FIG. 5 is a block diagram showing an example of an image magnification varying circuit.

FIG. 5 shows the details of the image magnification varying circuit 33 shown in FIG. 4.

At first there will be explained a circuit for effecting an image reduction.

A D-type flip-flop (DFF) 51 latches input image data in response to image clock pulses WRCK supplied in synchronization with said input image data.

A counter 52, for generating the read-out addresses of a RAM 54, is cleared by a synchronization signal WRST and counts upwards from zero in synchronization with the clock pulses WRCK.

A selector 53 selects either the CPU 35 or the counter 52 for supplying the RAM 54 with address signals and control signals. It usually selects the counter 52 through a port A to read the timings stored in the RAM 54, and the CPU 35 is selected through a port B only when the data of the RAM 54 are to be changed.

The RAM 54 stores plural timings relating to the image clock pulses WRCK, corresponding to the address signals generated by the counter 52. Based on the timing information previously set in the RAM 54 by the CPU 35, the timing signals A are released according to the address signals from the counter 52, in synchronization with the synchronization signal WRST.

A signal WREB, included in the timing signals A, is used for generating clock pulses WRCU for a counter 57, for generating write-in address signals for RAM's 58, 60.

A D-type flip-flop 55 and an OR gate 56 are provided to generate the clock pulses WRCU from the signal WREB. The counter 57 is cleared for example by the synchronization signal WRST and then counts upward from zero according to clock pulses WRCU.

In the following there will be explained a circuit for image enlargement. A D-type flip-flop 63 latches data read from the RAM 58 or 60 selected by a selector 60, according to external image clock pulses RDCK.

A counter 64, for generating the read-out addresses for a RAM 66, is cleared for example by a synchronization signal RDST and then counts upwards from zero according to the clock pulses RDCK.

A selector 65 selects either the CPU 35 or the counter 64, for supplying the RAM 66 with the address signals and control signals. It usually selects the counter 64 to read the timings stored in the RAM 66, and the CPU 35 is selected only when the data of the RAM 66 are to be changed.

The RAM 66 stores plural timings relating to the image clock pulses RDCK, corresponding to the address signals generated by the counter 66. Based on the timing information previously set in the RAM 66 by the CPU 35, the timing signals B are released according to the address signals from the counter 64, in synchronization with the synchronization signal RDST.

A signal RDEB, included in the timing signals B, is used for generating clock pulses RDCU for a counter 69, for generating read-out address signals for the RAM's 58, 60.

A D-type flip-flop 67 and an OR gate 68 are provided to generate the clock pulses RDCU from the signal RDEB. The counter 69 is cleared for example by the synchronization signal RDST and then counts upward from zero according to clock pulses RDCU.

The RAM's 58, 60 execute image data writing and reading according to the write-in addresses from the counter 57 or the read-out addresses from the counter 69, selected by selectors 59, 61, and constitute a double buffer in which a RAM is used for a write-in operation while the other RAM is used for a read-out operation.

Figure 6:
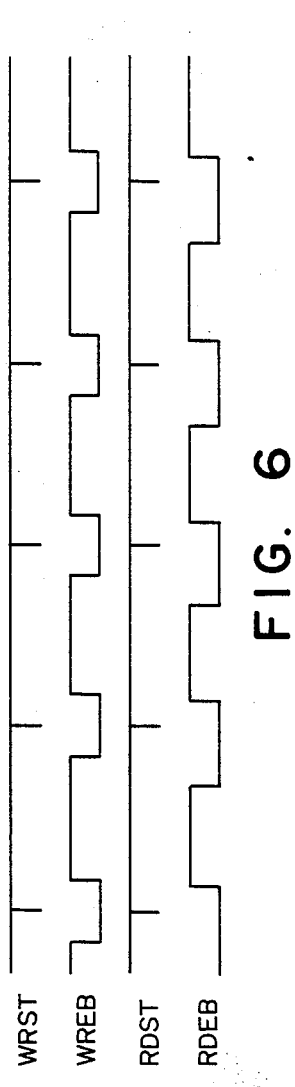
FIG. 6 is a timing chart showing the timing of various signals in FIG. 5.

FIG. 6 shows an example of timings of the signals WRST, RDST, WREB and RDEB. It is assumed that data for equal-size image reading are set, and the frequency of the clock pulses RDCK is higher than that of the clock pulses WRCK. Thus the duration of the RDEB signal is slightly shorter.

In the present embodiment the timings are defined by a read/writable memory such as a RAM, so that the signals WREB, RDEB can be generated at arbitrary timings with respect to the synchronization signals WRST, RDST as shown in FIG. 6.

Figure 7:
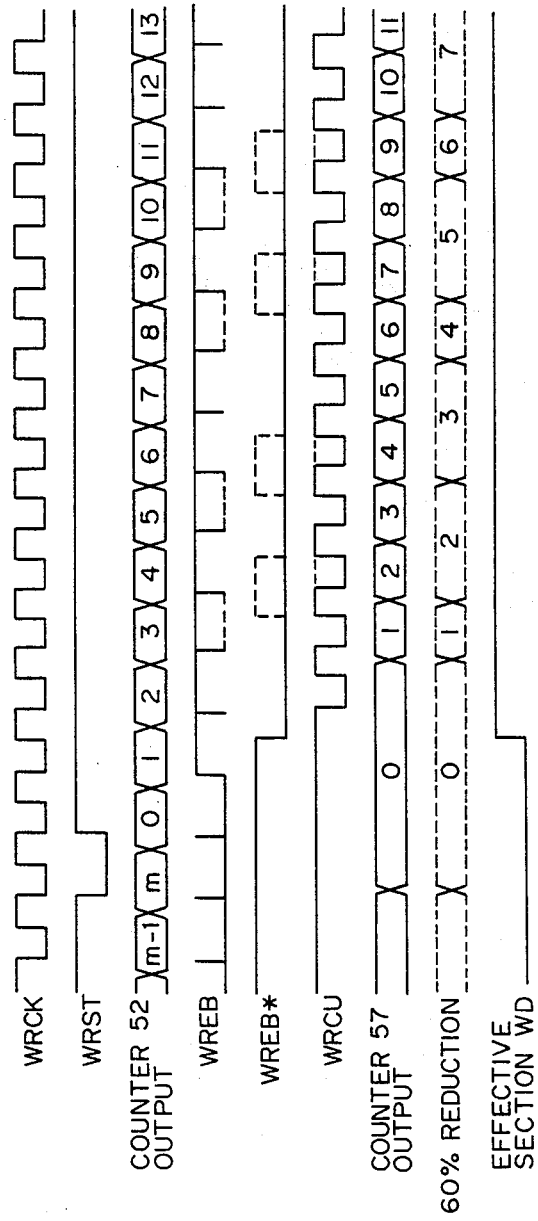
FIG. 7 is a timing chart showing the details of an image reduction.

FIG. 7 is a timing chart showing the details of an image reducing operation, wherein broken lines indicate timings at an image reduction 60%.

The counter 52 is a synchronized-clearing counter composed for example of an SN74LS163, a standard TTL device supplied by Texas Instruments, and is cleared from a count m to a count 0 when the synchronization signal WRST is shifted to the low level state and the output Q is stepped upwards at the start edge of the clock pulses WRCK.

In the present embodiment the WREB signal is stored from the address 1 of the RAM 54 and is read in succession by the count signals of the counter 52 as shown in FIG. 7, thus generating signals WREB* and WRCU.

The counter 57 is an unsynchronized-clear counter composed for example of an SN74LS161, a standard TTL device supplied by Texas Instruments, and the count is cleared to zero when the synchroniation signal WRST is shifted to the low level state and the output signal Q is stepped upwards at the starting edge of the clock pulses WRCU.

The clock pulses WRCU are used not only for the up-counting operation of the counter 57 but also as the write-in pulses for data storage in the RAM's 58, 60.

As will be apparent from FIG. 7, an image reduction to 60% can be achieved in the CPU 35 by setting the WREB signal in the RAM 54 after thinning out two pixels for every five pixels. In this case the RDEB signal for equal-size image is set in the RAM 66.

Figure 8:
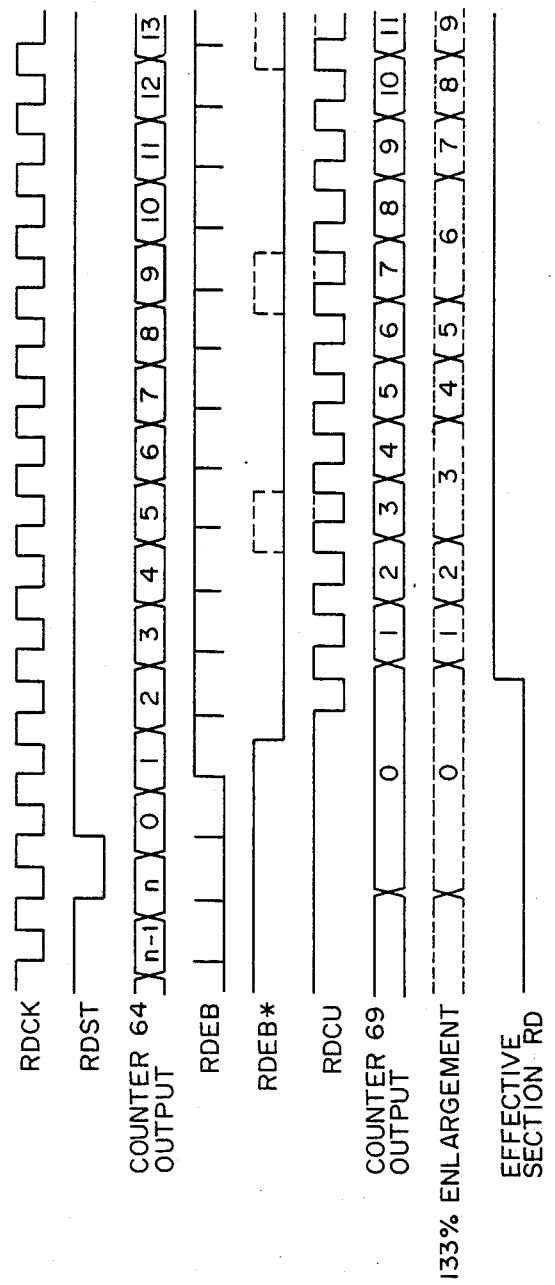
FIG. 8 is a timing chart showing the details of an image enlargement.

FIG. 8 is a timing chart showing the details of an image enlarging operation, wherein broken lines indicate the timings of an enlargement to 133%.

The counter 64 is a synchronized-clear counter composed for an example of SN74LS163, a standard TTL device supplied by Texas Instruments. The count n is cleared to zero as shown in FIG. 8 when the synchronization signal RDST is shifted to the low level state, and the output Q is stepped upwards at the state of the clock pulses RDCK.

In the present embodiment, it is assumed that the signal RDEB is stored from the address 1 of the RAM 66, and is read in succession by the count signals of the counter 64, thus generating the signals RDEB* and RDCU as shown in FIG. 8.

The counter 69 is an unsynchronized-clear counter composed for example of an SN74LS161, a standard TTL device supplied by Texas Instruments. The count is cleared to zero as shown in FIG. 8 when the synchronization signal RDST is shifted to the low level, and output Q is stepped upwards at the start edge of the clock pulses RDCU.

As will be apparent from FIG. 8, and image enlargement to 133% can be achieved, in the CPU 35, by setting the RDEB signals in the RAM 66 after thinning out a pixel in every four pixels. In such case the WREB signal for equal size mode is set in the RAM 54.

In the following there will be explained the control sequence of the CPU 35.

Figure 9:
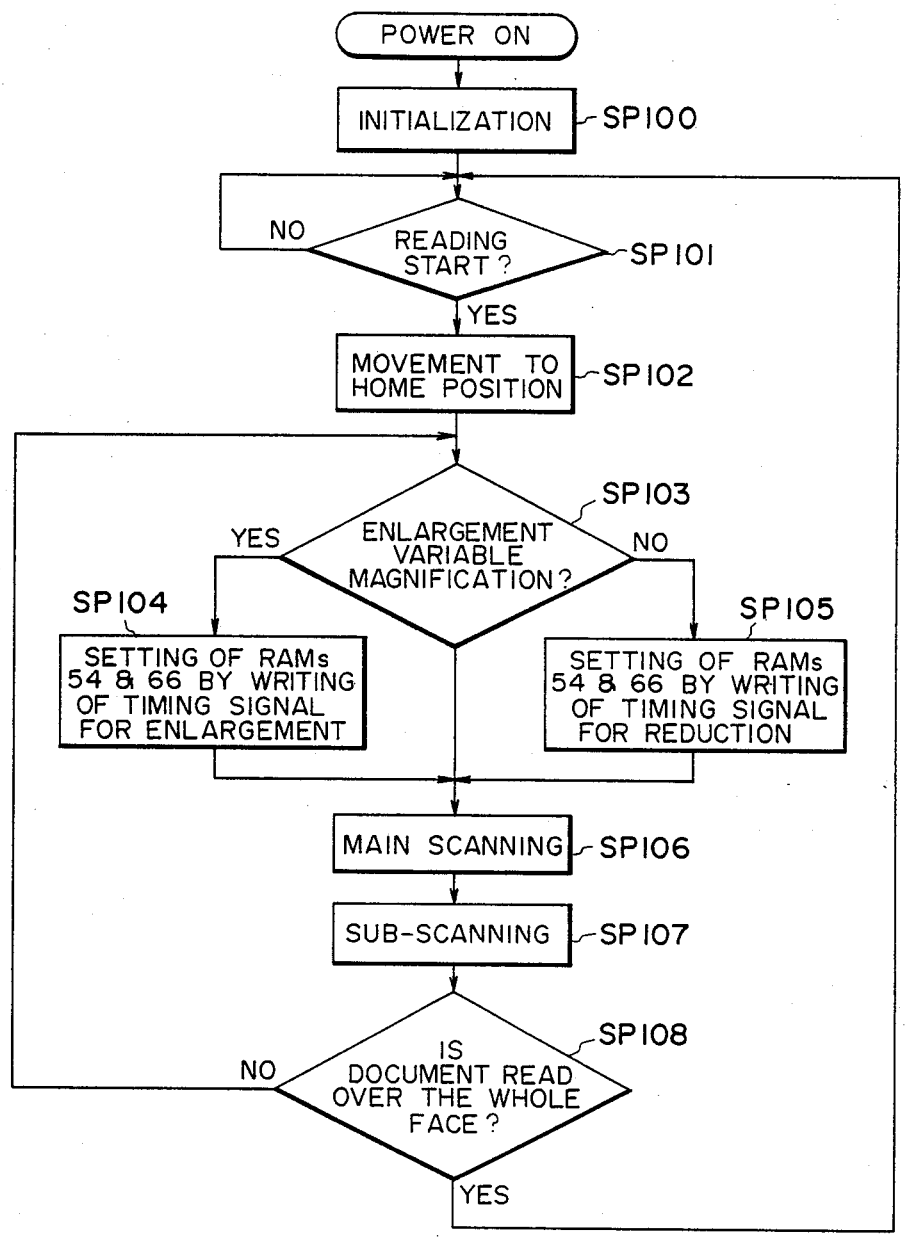
FIG. 9, 10A-B and 11a-b are flow charts showing control sequence of a CPU 35.

FIG. 9 shows an example of the general flow chart for the CPU 35.

When the power supply to the apparatus is turned on, a step SP100 executes initialization of the apparatus, and a next step SP101 awaits the entry of a reading start signal. In response to the entry of said start signal, a step SP102 moves the CCD image sensor 1 to the home position HP shown in FIG. 1, thus starting an original image reading operation.

Said image reading operation is conducted by repeating the movements in the main and sub-scanning directions as shown in FIG. 1, and timing signals are set in the RAM's 54, 66 immediately before each main scanning to effect image size variation during the main scanning. The setting of said timing signal uses different algorithms depending on whether the image is enlarged or reduced, so that a step SP103 divides the cases, and a step SP104 sets the timing signal for image enlargement while a step SP105 sets the timing signal for image reduction. In case of the equal-size image reading, the sequence proceeds also to the step SP105 to effect an image reducing process with a rate of reduction to 100%. Subsequently a step SP106 executes a main scanning, and a step SP107 executes a sub-scanning. A step SP108 discriminates whether the entire original image has been read by the repetition of the foregoing steps, and if not, the sequence returns to the step SP103. On the other hand, if the image reading has ben completed, the sequence proceeds to the step S101 to enter a standby state awaiting a new image reading.

Figure 10B:
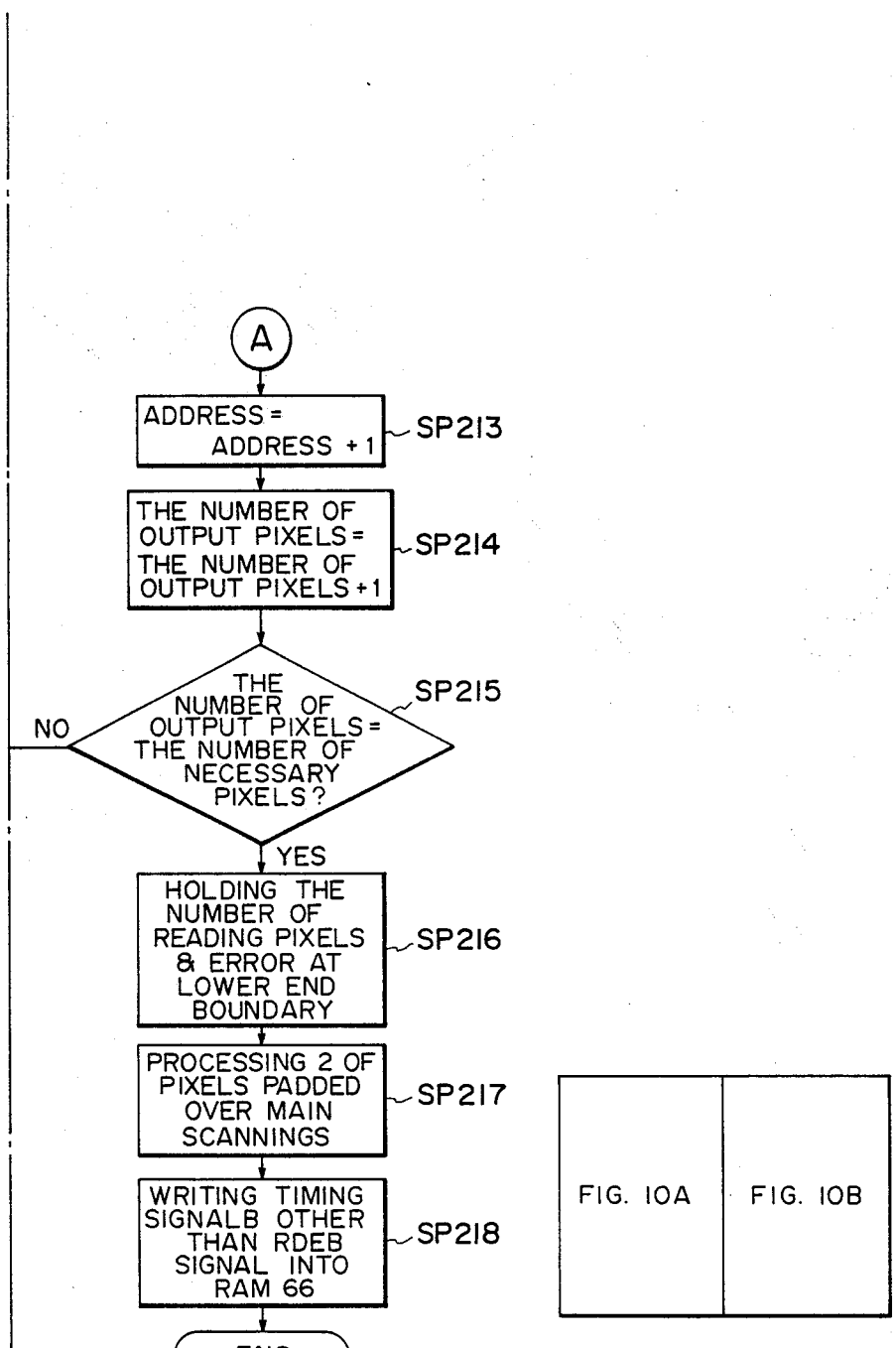
Figure 10:
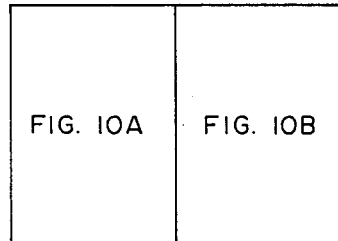
Figure 10A:
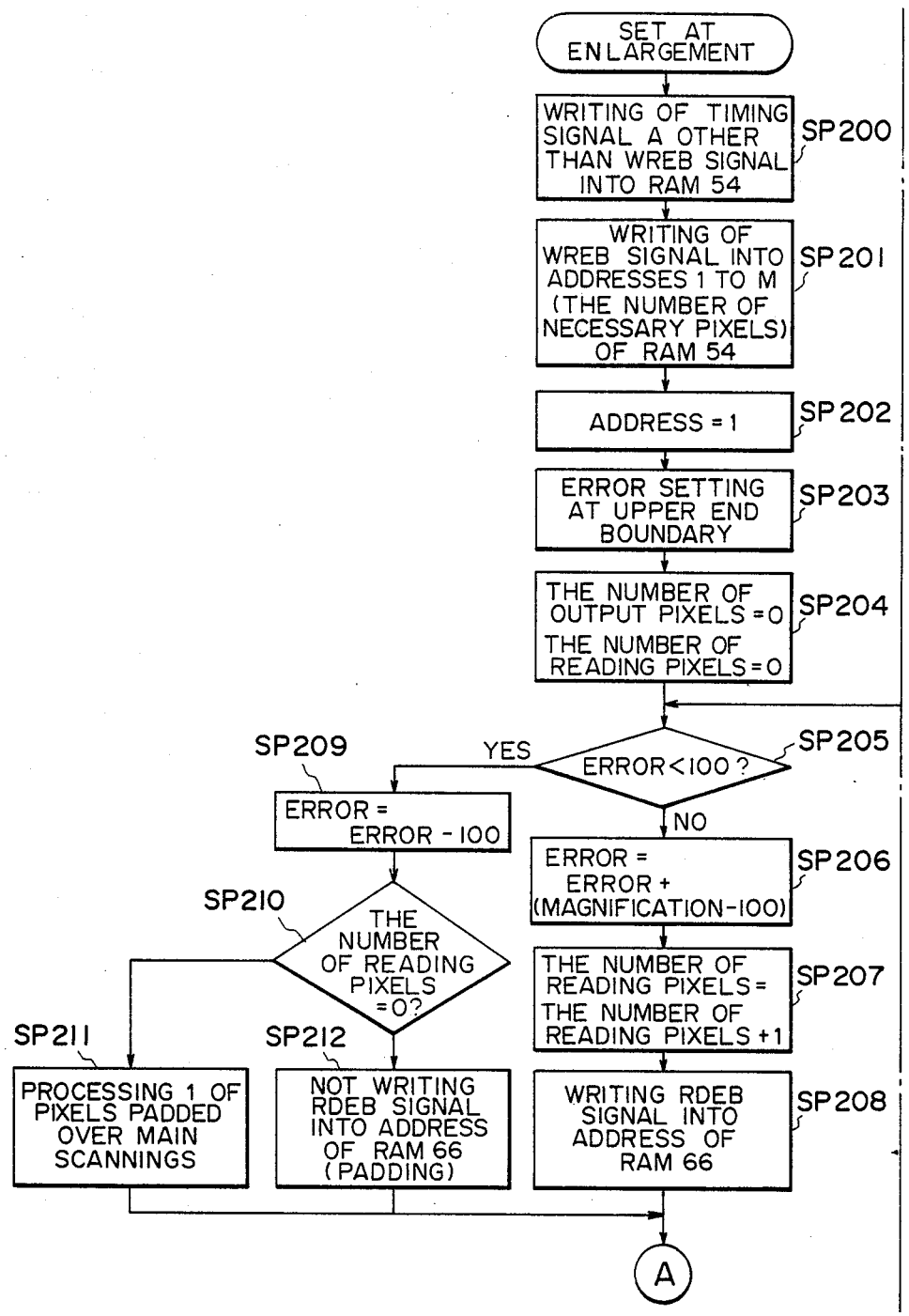

Now reference is made to a detailed flow chart shown in FIG. 10, for explaining the setting of the RAM's 54, 66 for image enlargement executed in the step SP104 in FIG. 9.

In this sequence, steps SP200–SP201 write the timing signals into the RAM 54, and steps SP202–SP218 write the timing signals into the RAM 66. The step SP200 executes the writing of the timing signals A other than the WREB signal into the RAM 54.

In the following the number of image data to be supplied to a following circuit is called "necessary pixel number". The step SP201 sets the selector 53 to the port B to enable access of the CPU to the RAM 54, and writes the WREB signal from the address 1 of the RAM 54 to an address corresponding to the necessary pixel number. By writing the WREB signal from the address 1 to the address corresponding to the necessary pixel number, it is rendered possible, at the original image reading, to store consecutive image data of the necessary pixel number without thinning out into the RAM 58 or 60, starting from the second image data, in synchronization with the WRST signal. This is equivalent to the setting in the RAM 54 at the equal-size mode.

The steps SP202–SP217 sets the selector 65 at the port B to enable the access of the CPU to the RAM 66, and write the RDEB signal into the RAM 66. The "address" which is given an initial value "1" in the step SP202 is a variable indicating the address of the RAM 66. The step SP203 sets an "error" at the upper boundary of a CCD scanning said error is a variable indicating the difference between the desired image magnification and the actual image magnification. Said "error" at the upper boundary is zero at the first main scanning, and, at the n-th main scanning, it is selected equal to the "error" at the lower boundary in the (n−1)-th main scanning. In this manner the error in a main scanning is controlled in consideration of the error in the preceding main scanning, so that an exact image connection is achieved in an arbitrary image enlargement.

The step SP204 sets an initial value of zero in a counter for setting the "output pixel number" of the padded image data read from the RAM 58 or 60 according to the clock pulses RDCK, and in a counter for setting the "read pixel number" of the image data required for preparing the image data of the "output pixel number". A loop starting from the step SP205 writes the RDEB signal for padding the image data according to the "error". At the start (immediately before the step SP205) in an n-th loop, there stands a relationship:

"error"=("read pixel number"×image magnification/100−"output pixel number")×100

This relationship can be re-written as follows, with a suffix n:

"error$_n$"=("read pixel number$_n$"×image magnification/100−"output pixel number$_n$")×100

A padding process is executed when said "error$_n$" exceeds 100.

By said padding the "error$_{n+1}$" can be written as:

"error$_{n+1}$" = ("read pixel number$_n$" × image magnification/100 − ("output pixel number$_n$" + 1)) ×

100 = "error$_n$" − 100 so that it becomes smaller by 100. This process is executed in the steps SP209 and SP212 in the flow chart.

On the other hand, if the "error$_n$" is less than 100, the RDEB signal is written in an address of the RAM 66 for releasing said signal RDEB at a timing represented by the "address" whereby the "read pixel number" increases by 1. Thus:

"error$_{n+1}$" = (("read pixel number$_{n+1n}$") × image magnification/100 − ("output pixel number$_n$" + 1)) ×

100 = "error$_n$" + (image magnification − 100)

This process is executed by the steps SP206, SP207 and SP208.

The steps SP210, SP211 and SP217 process the pixels to the padded over two neighboring main scannings.

For the first pixel at the start of the main scanning, despite that the "error" exceeds 100, there are not preceding pixels to be padded. It is therefore necessary to write the RDEB signal in the RAM 66 thereby reading the data of the first pixel from the RAM's 58, 60. Thus a step SP210 discriminates whether it is the first pixel, and a step SP211 executes a process similar to that of the steps SP207 and SP208.

A step SP213 increases the "address" by 1, and indentifies whether the RDEB signal is to be written in a succeeding address of the RAM 66 in a next loop. Then a step SP214 increases the "output pixel number" by 1 regardless whether the RDEB signal has been written in the RAM 66 in the steps SP212, SP208.

A step SP215 discriminates whether the "output pixel number" has reached the "necessary pixel number", and, if not, the sequence returns to the step SP205. On the other hand, if said number has been reached, indicating the completion of writing, in the RAM 66, of the RDEB signal required for the image enlargement in a main scanning, a step SP216 records the "read pixel number" and "error" at the lower boundary. Said "read pixel number" is used as next pitch of movement of the CCD image sensor 1 in the sub scanning direction, and said "error" is used as the "error" at the upper boundary in the next main scanning.

A step SP213 increases the "address" by 1, and identifies whether the RDEB signal is to be written in a succeeding address of the RAM 66 in a next loop. Then a step SP214 increases the "output pixel number" by 1 regardless whether the RDEB signal has been written in the RAM 66 in the steps SP212, SP208.

A step SP215 discriminates whether the "output pixel number" has reached the "necessary pixel number", and, if not, the sequence returns to the step SP205. On the other hand, if said number has been reached, indicating the completion of writing, in the RAM 66, of the RDEB signal required for the image enlargement in a main scanning, a step SP216 records the "read pixel number" and "error" at the lower boundary. Said "read pixel number" is used as next pitch of movement of the CCD image sensor 1 in the sub scanning direction, and said "error" is used as the "error" at the upper boundary in the next main scanning.

A step SP217 discriminates whether the "error" is equal to or larger than 100, and, if so, the pixel released immediately before has to be released at the start of the next main scanning. For this reason the "read pixel number" indicating the pitch of the sub scanning movement of the CCD image sensor 1 is decreased by one.

Then a step SP218 writes the timing signals B other than the RDEB signal into the RAM 66.

Figure 11A:
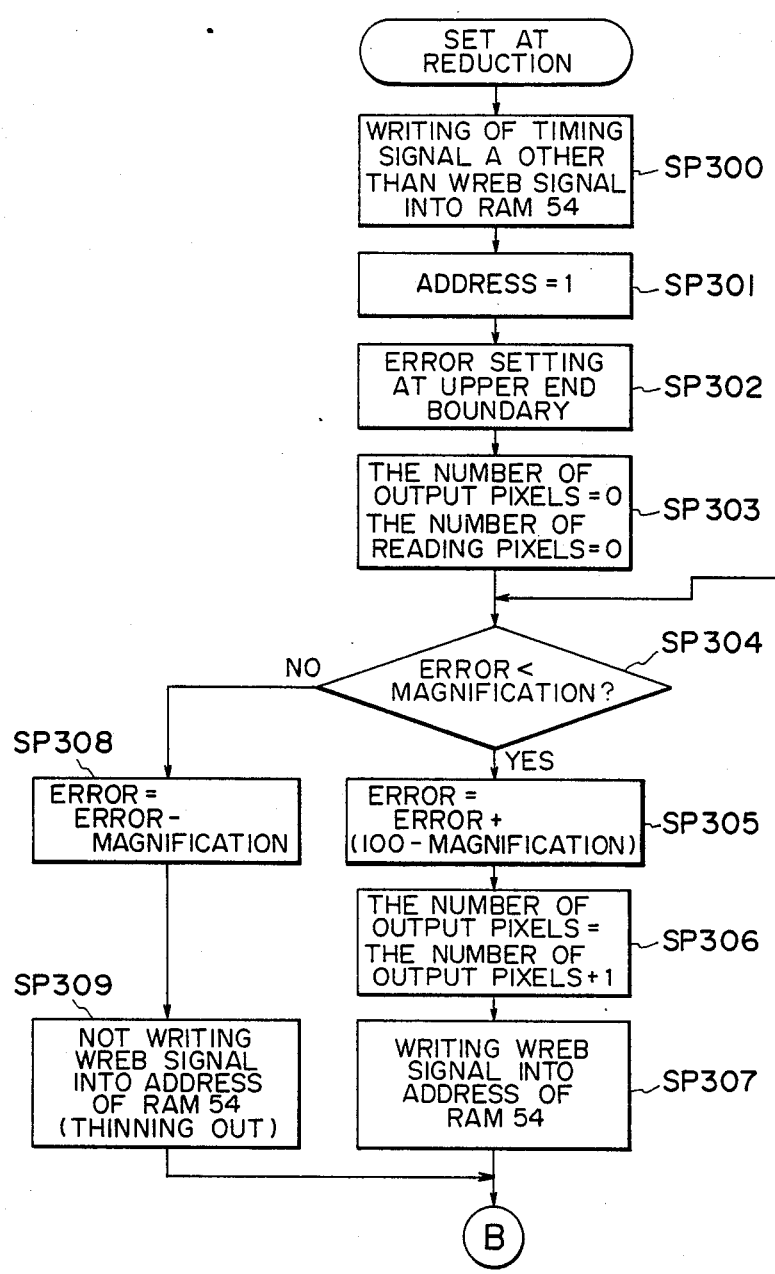
Figures 11, 11B:
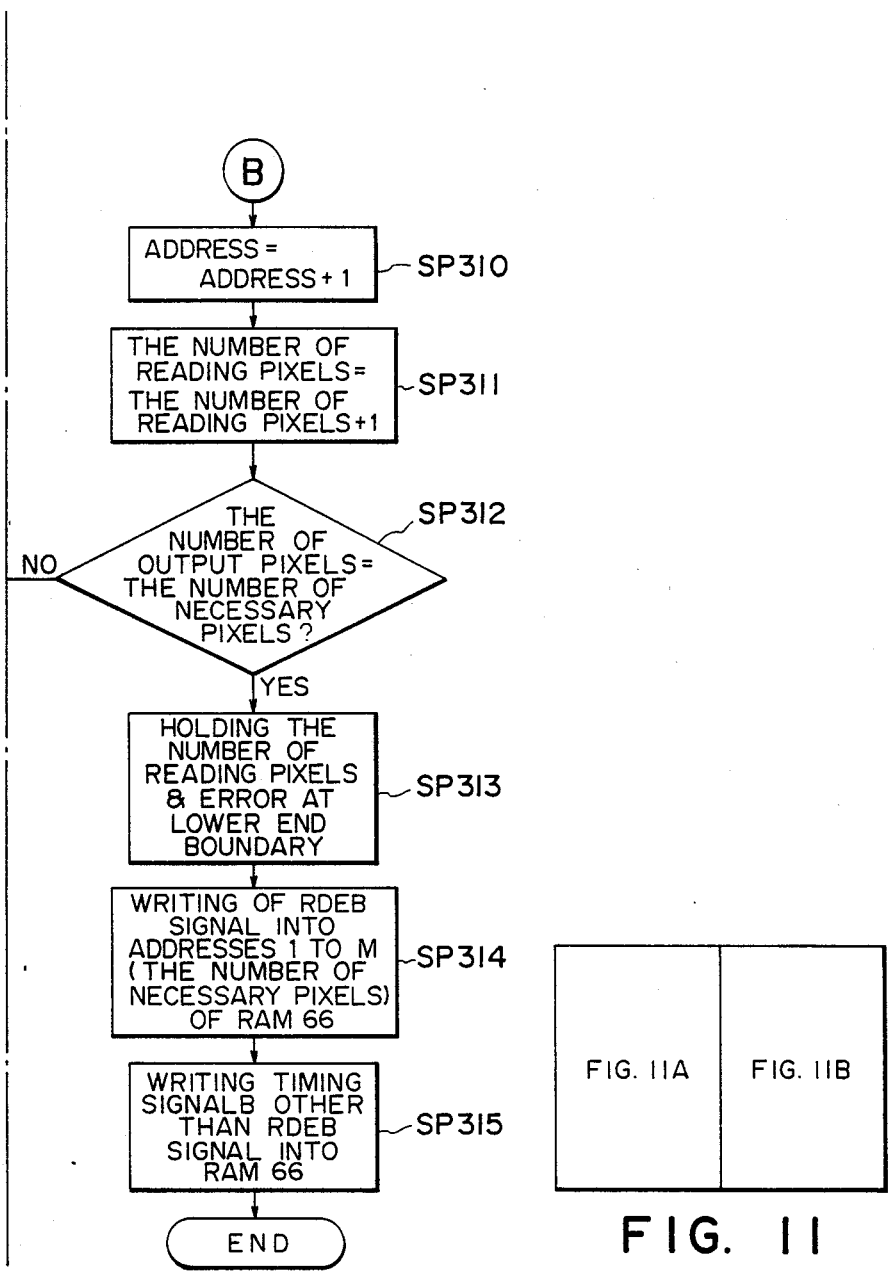

Now reference is made to a detailed flow chart shown in FIG. 11, for explaining the setting of the RAM's 54, 66 in an image reduction, executed in the step SP105 shown in FIG. 9.

In this sequence, Steps SP300–SP313 write the timing signals into the RAM 54, and steps SP314–SP315 write the timing signals into the RAM 66. The step SP300 executes the writing of the timing signals A other than the WREB signal into the RAM 54.

The steps SP301–SP313 sets the selector 53 to the port A to enable the access of the CPU to RAM 54, and writes the WREB signal into the RAM 54. The "address" which is given an initial value "1" in the step SP301 is a variable indicating the address of the RAM 54.

The step SP302 sets an "error" at the upper boundary of a CCD scanning. Said "error" has the same means as the error in the image enlargement. Said "error" at the upper boundary is zero at the first main scanning, and, at the n-th main scanning, it is selected equal to the "error" at the lower boundary in the (n−1)-th main scanning. In this manner exact image connection can be achieved at an arbitrary image reduction, as in the case of image enlargement.

The step SP303 gives an initial value of zero to a counter for setting the "output pixel number" of the thinned out image data to be written into the RAM's 58, 60, and to a counter for setting the "read pixel number" of the image data required for the image data of "output pixel number". A loop starting from the step SP304 writes the WREB signal for the thinning out process of the image data corresponding to the "error". At the start (immediately before the step SP304) in an n-th loop, there stands a relation:

"error"=("output pixel number"−"read pixel number"×image magnification/100)×100

This relationship can be re-written as follows with a suffix n:

"error $n$"=("output pixel number$_n$"−"read pixel number$_n$"×image magnification/100)×100

A thinning out process is executed when said "error$_n$" exceeds the image magnification.

By said thinning out the error$_{n+1}$" can be written as:

$$\begin{aligned}\text{"error}_{n+1}\text{"} &= (\text{"output pixel number}_n\text{"} - \\ & \quad (\text{"read pixel number}_n\text{"} + 1) \times \\ & \quad \text{image magnification}/100) \times 100 \\ &= \text{"error}_n\text{"} - \text{image magnification}\end{aligned}$$

so that it becomes smaller by the image magnification. This process is executed in the steps SP308 and SP309 in the flow chart.

On the other hand, if the "error" is less than the image magnification, the WREB signal is written at a timing represented by the "address" whereby the "output pixel number" increases by 1. Thus:

$$\begin{aligned}\text{"error}_{n+1}\text{"} &= ((\text{"output pixel number}_n\text{"} + 1) - \\ & \quad (\text{"read pixel number}_n\text{"} + 1) \times \\ & \quad \text{image magnification}/100) \times 100 \\ &= \text{"error}_n\text{"} + (100 - \text{image magnification})\end{aligned}$$

This process is executed by the steps SP305, SP306 and SP307.

A step SP310 increases the "address" by 1, and identifies whether the WREB signal is to be written in a succeeding address of the RAM 54 in a next loop. Then a step SP311 increases the "read pixel number" by 1 regardless whether the WREB signal has been written in the RAM 54 in the steps SP307, SP309.

A step SP312 discriminates whether the "output pixel number" has reached the "necessary pixel number", and, if not, the sequence returns to the step SP304. On the other hand, if said number has been reached, indicating the completion of writing, in the RAM 54, of the WREB signal required for the image reduction in a main scanning, a step SP313 records the "read pixel number" and "error" at the lower boundary. Said "read pixel number" is used as next pitch of movement of the CCD image sensor 1 in the sub-scanning direction, and said "error" is used as the "error" at the upper boundary in the next main scanning.

A step SP314 writes the RDEB signal in the RAM 66, from address 1 to an address corresponding to the "necessary pixel number". By writing the RDEB signal from the address 1 of the RAM 66 to the address corresponding to the necessary pixel number, it is rendered possible, at the original image reading, to send consecutive image data of the necessary pixel number from the RAM 58 or 60 to a succeeding circuit, starting from the second timing, in synchronization with the RDST signal. This is equivalent to the setting in the RAM 66 at the equal-size mode.

Finally a step SP315 writes the timing signals B other than the RDEB signal in the RAM 66.

As explained in the foregoing, at the padding or thinning out of image data, the WREB signal or RDEB signal is selectively written in each address of the RAM 54 or 66, and the writing position is determined in consideration of the image magnification and the padding or thinning out process in the preceding main scanning operation. Consequently, even at the junction between neighboring main scannings, the pixel positions where the image data are to be padded or thinned are determined with a pitch same as in other areas, so that it is rendered possible to achieve satisfactory image size variation without distortion.

In the foregoing embodiments a RAM is employed for temporary storage of image data, but it is also possible to employ other memories such as a first-in-first-out memory.

If the number of image magnifications to be used is limited, it is also possible to store plural sets of information on image size variation in a read-only memory (ROM) and to select a set from said ROM, instead of data setting for image size variation.

As explained in the foregoing, it is rendered possible, in an image reading apparatus of serial scanning process, to easily achieve image connection at an image size variation.

Also the image size varying circuit, which has required a complex circuit structure, can now be achieved with a simple structure.

Also the information on the image size variation can be controlled with a CPU, so that it is rendered possible to achieve image connection at image size variation or to control the amount of movement in the sub scanning direction, which has been difficult to achieve in the prior technology.

The present invention is not limited to the foregoing embodiments, but is subject to various modifications and variations within the scope and spirit of the appended claims.

We claim:

1. An image processing apparatus comprising:
   reader means, comprising a linear image sensor, for reading an image line by line and generating image data;
   first moving means for repeatedly moving a reading position of said reader means in a main scanning direction a plurality of times;
   second moving means for moving the reading position of said reader means in a sub-scanning direction every time the reading position of said reader means is moved in the main scanning direction;
   process means for performing a variable magnification processing on the image data generated by said reader means; and
   control means for controlling the variable magnification processing of said process means, said control means controlling the variable magnification processing to be performed on the image data during a succeeding movement of the reading position of said reader means in the main scanning direction, in accordance with the variable magnification processing performed on the image data during a preceding movement of the reading position of said reader means in the main scanning direction.

2. An image processing apparatus according to claim 1, wherein said process means is adapted to perform a padding processing or a thinning out processing on the image data in accordance with a variable magnification rate.

3. An image processing apparatus according to claim 2, wherein said control means is adapted to determine image data to be subjected to the padding or thinning out processing.

4. An image processing apparatus according to claim 1, wherein said process means includes storage means for storing the image data generated by said reader means, wherein said control means is adapted to control read/write operation of said storage means.

5. An image processing apparatus according to claim 1, wherein said reader means generates the image data pixel by pixel.

6. An image processing apparatus according to claim 1,
   wherein said process means comprises memory means for storing data related to the position of the image data to be subjected to the variable magnification processing, and said process means performs the variable magnification processing in accordance with the data stored in said memory means.

7. An image processing apparatus according to claim 6, wherein said control means is adapted to determine the data to be stored in said memory means in accordance with the variable magnification rate.

8. An image processing apparatus according to claim 6, wherein said memory means is adapted to store data related to the position of image data to be padded or thinned out.

9. An image processing apparatus comprising:
   reader means, comprising a linear image sensor, for reading an image line by line and generating image data pixel by pixel;
   first moving means for repeatedly moving a reading position of said reader means in a main scanning direction a plurality of times;
   second moving means for moving the reading position of said reader means in a sub-scanning direction every time the reading position of said reader means is moved in the main scanning direction;
   process means for performing a padding processing or a thinning out processing on the image data generated by said reader means; and
   control means for controlling the padding processing or the thinning out processing of said process means, said control means determining the pixel positions of the image data to be subjected to the padding processing or the thinning out processing during the succeeding movement of the reading position of said reader means in the main scanning direction, in accordance with the processing performed on the image data during a preceding movement of the reading position of said reader means in the main scanning direction.

10. An image processing apparatus according to claim 9, wherein said process means comprises memory means for storing data related to the pixel positions of the image data to be padded or thinned out and said process means provides the padding or thinning out processing in accordance with the data stored in said memory means.

11. An image processing apparatus according to claim 9, wherein said process means includes storage means for storing the image data generated from said reader means, wherein said control means is adapted to control read/write operation of said storage means.

12. An image processing apparatus according to claim 10, wherein said control means is adapted to determine the data to be stored in said memory means.

13. An image processing apparatus comprising:

reader means, comprising a linear image sensor, for reading an image line by line and generating image data;

first moving means for repeatedly moving a reading position of said reader means in a main scanning direction a plurality of times;

second moving means for moving the reading position of said reader means in a sub-scanning direction every time the reading position of said reader means is moved in the main scanning direction;

process means for performing a variable magnification processing on the image data generated by said reader means; and control means for controlling a movement amount of the reading position of said reader means by said second moving means in the sub-scanning direction, said control means determining the movement amount of the reading position of said reader means by said second moving means in the sub-scanning direction in accordance with the variable magnification processing performed on the image data during a preceding movement of the reading position of said reader means in the main scanning direction.

14. An image processing apparatus according to claim 13, wherein said process means is adapted to perform a padding processing or a thinning out processing on the image data in accordance with a variable magnification rate.

15. An image processing apparatus according to claim 13, wherein said process means comprises memory means for storing data related to the position of the image data to be subjected to the variable magnification processing, and said process means performs the variable magnification processing in accordance with the data stored in said memory means.

16. An image processing apparatus according to claim 13, wherein said reader means generates the image data pixel by pixel.

* * * * *

UNITED STATES PATENT AND TRADEMARK OFFICE
CERTIFICATE OF CORRECTION

PATENT NO. : 4,918,542
DATED : April 17, 1990
INVENTOR(S) : NAO NAGASHIMA, ET AL.

Page 1 of 2

It is certified that error appears in the above-identified patent and that said Letters Patent is hereby corrected as shown below:

COLUMN 1

Line 13, "assigned" should read --assignee--.
    Line 19, "sub scanning" should read --sub-scanning--.
    Line 40, "sub scanning" should read --sub-scanning--.

COLUMN 3

Line 34, "coincide" should read --coincide with--.

COLUMN 5

Line 1, "sub scanning" should read --sub-scanning--.
    Line 12, "upwards" should read --upward--.
    Line 38, "selector 60," should read --selector 62,--.

COLUMN 6

Line 17, "image reduction 60%." should read --image reduction to 60%.--.
    Line 48, "of SN74LS163," should read --of an SN74LS163,--.
    Line 52, "state" should read --start--.
    Line 66, "and" should read --an--.

COLUMN 7

Line 58, "sets" should read --set--.
    Line 64, "CCD scanning said" should read --CCD scanning. Said--.

UNITED STATES PATENT AND TRADEMARK OFFICE
CERTIFICATE OF CORRECTION

PATENT NO. : 4,918,542

DATED : April 17, 1990

INVENTOR(S) : NAO NAGASHIMA, ET AL.

Page 2 of 2

It is certified that error appears in the above-identified patent and that said Letters Patent is hereby corrected as shown below:

COLUMN 8

Line 42, "(("read pixel number$_{n+1n}$)"should read --(("read pixel number$_{n+1}$")--.

COLUMN 9

Line 6, "sub scanning" should read --sub-scanning--.
Line 24, "sub scanning" should read --sub-scanning--.
Line 31, "sub scanning" should read --sub-scanning--.
Line 51, "means" should read --meaning--.

COLUMN 10

Line 10, "error$_{n+1}$"" should read --"error$_{n+1}$"--.

COLUMN 11

Line 30, "sub scanning" should read --sub-scanning--.

Signed and Sealed this

Twenty-second Day of October, 1991

*Attest:*

HARRY F. MANBECK, JR.

*Attesting Officer*     *Commissioner of Patents and Trademarks*